Feb. 25, 1964 W. G. WADEY 3,122,167
MULTIWAY VALVE AND SEAL
Filed Aug. 16, 1961 3 Sheets-Sheet 1

INVENTOR.
WALTER G. WADEY
BY
*Griffin and Stokes*
ATTORNEYS

Feb. 25, 1964 W. G. WADEY 3,122,167
MULTIWAY VALVE AND SEAL
Filed Aug. 16, 1961 3 Sheets-Sheet 2

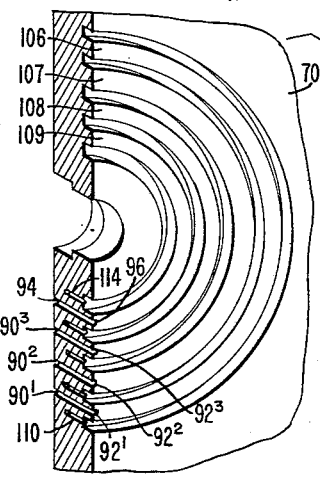

Feb. 25, 1964 W. G. WADEY 3,122,167
MULTIWAY VALVE AND SEAL
Filed Aug. 16, 1961 3 Sheets-Sheet 3
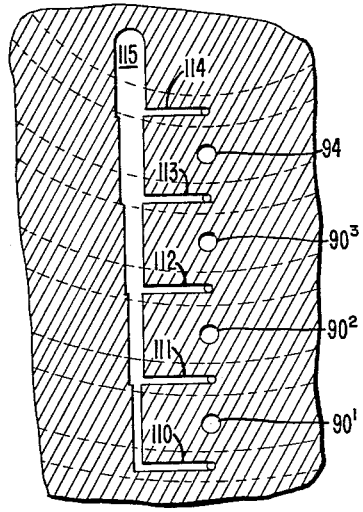
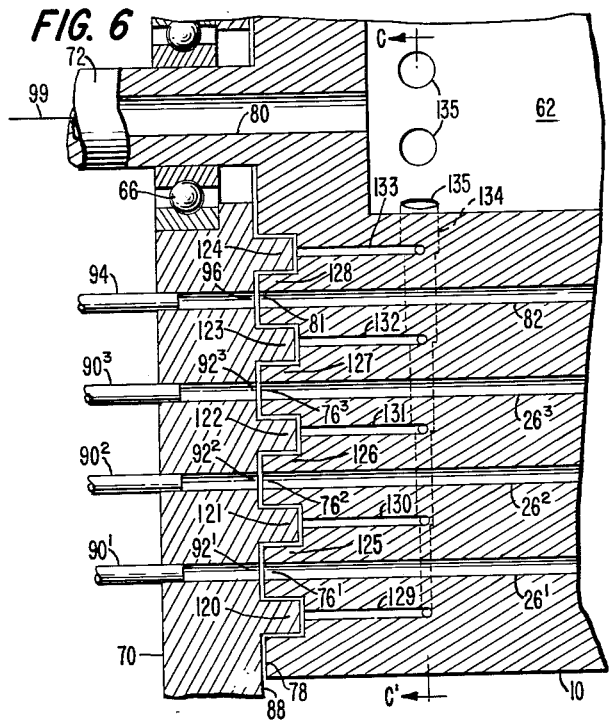
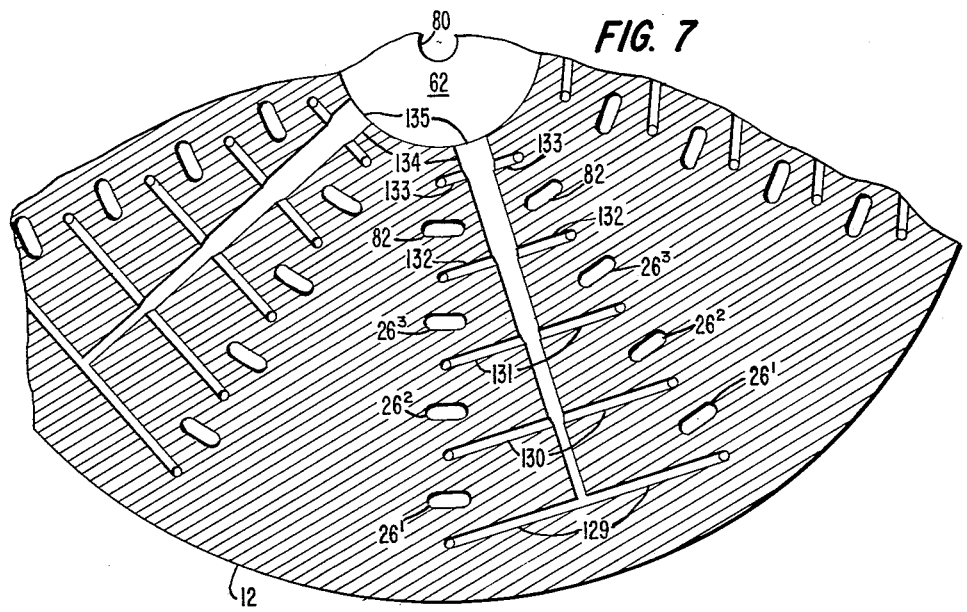

United States Patent Office 3,122,167
Patented Feb. 25, 1964

3,122,167
MULTIWAY VALVE AND SEAL
Walter Geoffrey Wadey, Wynnewood, Pa., assignor to Sperry Rand Corporation, New York, N.Y., a corporation of Delaware
Filed Aug. 16, 1961, Ser. No. 131,913
22 Claims. (Cl. 137—625.19)

The present invention relates to means for providing a fluid pressure shield, and more particularly, to means whereby isolation may be accomplished, one from another, between a plurality of fluid passageways temporarily formed in two members having surface movable with respect to one another.

In the rapidly developing field of fluid amplifier data processing systems, wherein digital control and information pulses are transmitted in a fluid medium, it may be desirable to transfer fluid pulses between mechanical members movable with respect to one another. The invention disclosed herewith is adapted to isolate a plurality of high pressure fluid lines, one from another, in the case where such lines have points of discontinuity occurring at the clearance between the members.

Therefore, an object of the present invention is to provide sealing means isolating each of a plurality of temporarily formed fluid passageways one from another, where each said passageway comprises first and second ducts terminated in ports respectively located in first and second mating surfaces movable with respect to one another.

Another object of the present invention is to provide sealing means between points of discontinuity in adjacent fluid pressure lines which comprises a labyrinthian corridor between said points of discontinuity, together with means for maintaining a relatively low pressure region therein.

This invention is particularly adapted to provide means for making a plurality of fluid connections to a rotating drum without the intermixing of said connections. It may therefore be utilized as the sealing means between the rotating punch drum and stationary face plate of the card punch disclosed in pending U.S. application Serial No. 54,086, now Patent Number 3,059,842, filed September 6, 1960, by the present inventor. In this pending application, O-seal rings or the like are employed to prevent the leakage of fluid from a high pressure control line either into the outside environment or into another. However, the present invention provides a more positive type seal without any causing friction loss between the adjacent surfaces of the rotating drum and stationary plate.

It is therefore another object of the present invention to provide means for sealing between a number of fluid pressure lines interconnected between a rotating drum member and a stationary face plate.

These and other objects of the present invention will be apparent during the course of the following description, which is to be taken in conjunction with the drawings, in which:

FIGURE 1 shows the use of the present invention in a card punch environment;

FIGURE 2 discloses a detailed sectional view of a first embodiment of the present invention;

FIGURE 4 shows a further sectional view of said first embodiment;

FIGURE 6 shows a second embodiment of the present invention; and

FIGURE 7 is a sectional view of said second embodiment.

Figure 1:
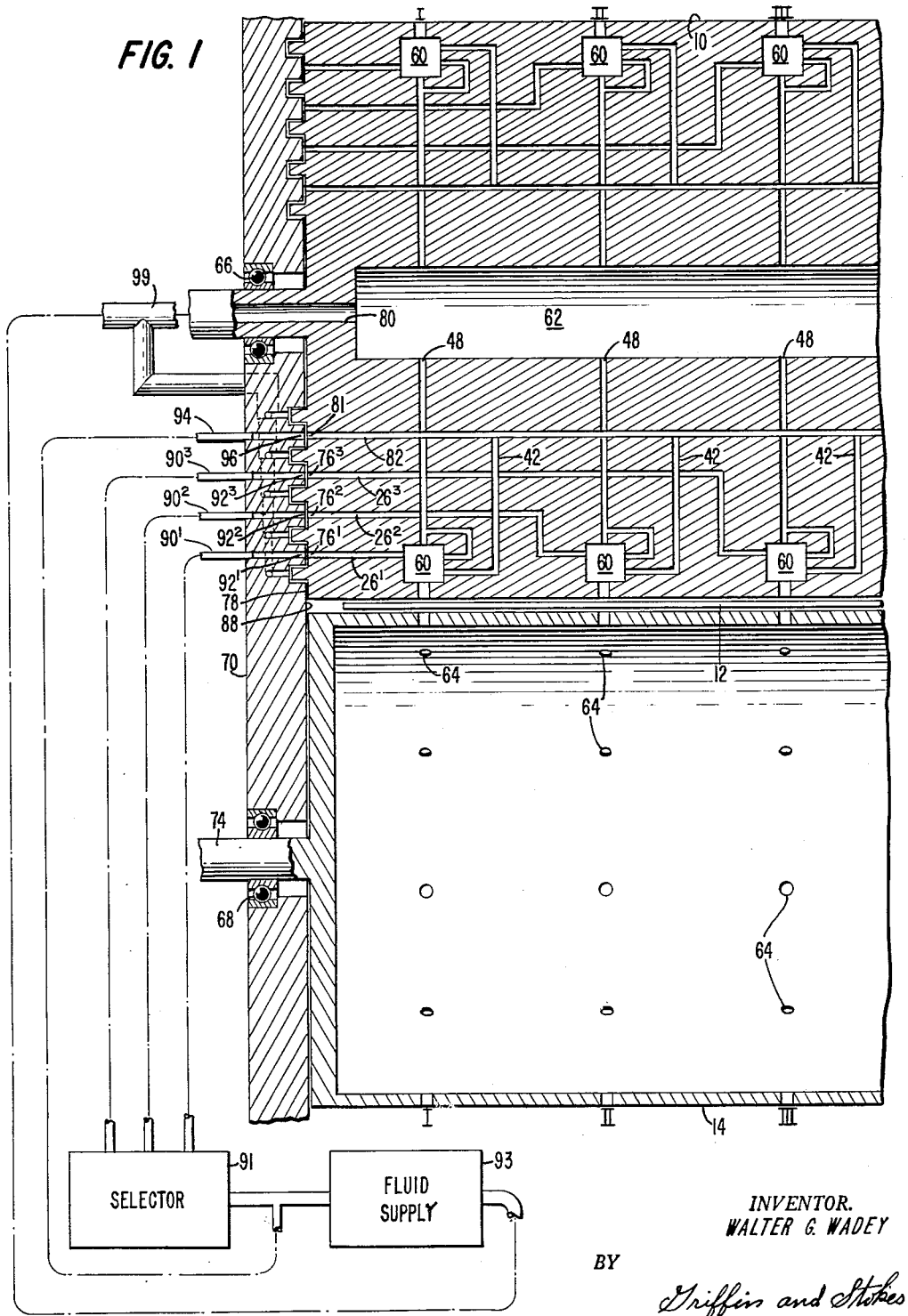

FIGURE 1 of the drawings is a sectional view of the punch and die drums according to the invention disclosed and claimed in said above identified pending application, and in which the present invention is particularly useful. The punch drum 10 comprises a substantially solid body surrounding a hollow core 62. A plurality of punches 60 are contained within the solid portion of drum 10 and arranged in a plurality of longitudinally extending rows circumferentially spaced about the periphery thereof. The number of punch rows depends upon the coding system employed and may, for example, consist of ten rows to enable the representation of numerical digits 0 through 9. The punches also are arranged in columns around the periphery of the drum so that one punch of each row lies in the same column as the corresponding punch of each of the other rows. For purposes of illustration only, three columns I, II and III have been shown, but will be obvious to those skilled in the art that the number of columns is determined only by the number of character columns to be punched on the card.

The die drum 14 comprises an outer shell surrounding a hollow interior. The outer shell contains a plurality of holes 64, one for each of the punches 60. The punch and die drums are axially aligned and rotate in synchronism so that successive holes 64 will be aligned with and capable of receiving successive punches 60 if the punches are extended through a canal 12 passing between them. Bearings 66 and 68 mounted in stationary side plate 70 permit the punch and die drums 10 and 14, respectively, to be continuously driven by means of shafts 72 and 74 from any suitable drive means not shown.

As explained in said above identified pending application, in order to energize any of the punches 60, a relatively high pressure pulse is applied thereto via its associated control signal duct 26. There is a group of ducts 26 for each punch row, each group containing as many ducts as there are punches in the row. For example, control signal duct 26¹ is associated with the punch 60 lying in column I of the row directly adjacent die drum 14 in FIGURE 1. When it is desired to energize punch 60, a pulse is applied via this control signal duct 26¹ to one inlet of punch 60, and the punch is extended so as to be inserted in its complementary die hole 64 in drum 14. The retraction of punch 60 occurs when a pulse is subsequently applied via a common duct 82 and individual duct 42 to a different inlet of the punch. An exhaust duct 48 is provided for each punch 60 to return the high pressure input pulses to the fluid source and thus create a closed system. As explained in the above identified pending application, one or more of the punches 60 lying in the row directly adjacent die drum 14 may be extended simultaneously if the same character must be recorded in more than one of the card columns. Thus, there may be two or more high pressure pulses simultaneously existing in the group of control signal ducts 26 associated with a punch row adjacent to the card.

Each of the control signal ducts 26 in each group terminates at a port or opening 76 in the end surface 78 of punch drum 10. Thus, for the embodiment shown, there are ten groups of three ports 76 spaced radially about axis 72. Each of the exhaust ducts 48 is connected to the hollow interior of drum 10 which in turn is connected via the passageway 80 in shaft 72 to the low pressure side of the external fluid supply 93. The control ducts 42 for each row of punches are connected to a common duct 82, as above described, which also terminates in a port 81 in the end surface 78. Thus, there are a total of ten ports 81 spaced about the drum axis 72 for the embodiment under consideration.

A plurality of control signal input ducts 90, equal in number to the ports 76 in any one of the groups, pass through the stationary side plate 70 and terminate at ports 92 in the inner plate surface 88. Each port $92^n$, of which there are three in the present embodiment, is located a distance from axis 72 so that it will be successively aligned with a corresponding port $76^n$ in each of the groups as the punch drum rotates. Thus, port $92^1$ successively aligns with the port $76^1$ in each of the ten groups. However, ports 92 simultaneously align with the ports 76 belonging to the punch row directly adjacent the card in order that actuating fluid pulses may be simultaneously applied to two or more punches. The control signal input ducts 90 are connected through a selective control device 91 to the high pressure side of the fluid supply 93. The selective control device may, for example, be one of the many types of pneumatic card sensing devices well-known in the art and does not comprise a part of the present invention. A single control duct 94 passes through the stationary side plate 70 and terminates at port 96 in the surface 88 thereof. Port 96 may be located a distance from axis 72 so that it will be successively aligned with each of the ports 81 as the drum rotates but at times slightly subsequent to the alignment of ports 92 with ports 76 of corresponding punch rows. This arrangement is shown in the above identified pending application.

From the above, it may be appreciated that as each punch row moves adjacent to card 12, a plurality of fluid passageways is temporarily formed, each of which extends through end plate 70 and drum 10 and through which a fluid pulse from selector 91 may be applied to a punch 60.

Each such passageway is comprised of two ducts, $90^n$ and $26^n$ which are respectively located in members being movable with respect to one another. For example, duct $90^1$ is located in stationary plate 70, and the corresponding duct $26^1$ is located in drum 10. However, each of said temporarily formed passageways has a point of discontinuity occurring at the ports $92^n$ and $76^n$ of its respective ducts $90^n$ and $26^n$. Inasmuch as a certain minimum clearance is desirable between the drum 10 and plate 70 to avoid wear of the mating surfaces 88 and 78 and to reduce friction loss, a pulse traversing the clearance distance between ports $92^n$ and $76^n$ may leak into the space between said mating surfaces. Any fluid thus escaping from its passageway may travel to either the outside environment, or to the ports $76^{n+1}$ or $76^{n-1}$ of the adjacent temporarily formed passageways. Any of these alternatives is undesirable, since, for example, a punch 60 may be falsely actuated by such leakage fluid entering an adjacent passageway.

Figure 2:
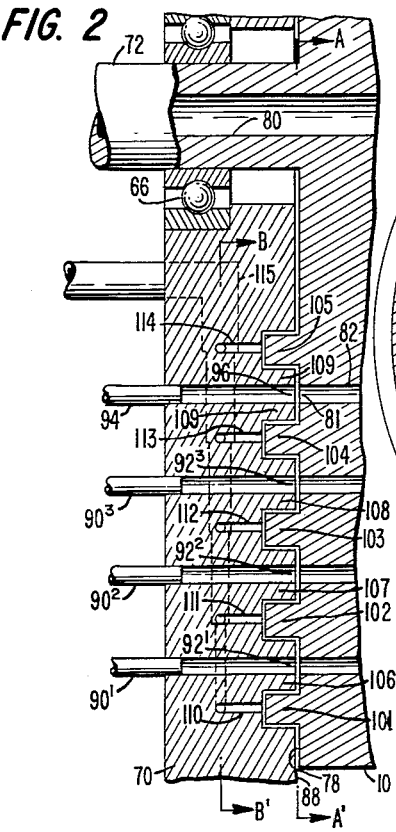

In order to prevent the leakage of fluid from one temporarily formed high pressure passageway to another because of the points of discontinuity engendered by the clearance between plate 70 and drum 10, the mating surfaces 88 and 78 are interleaved according to the present invention in such a manner as to form a labyrinthian corridor between the port locations of adjacent passageways. A relatively low pressure region is maintained in the center of each corridor so that any fluid escaping thereto is withdrawn and returned to the low pressure side of fluid supply 93, where it may subsequently be employed again in high pressure pulses. The details of these corridors are shown in FIGURE 2 which is an enlarged view of the lower left portion of drum 10 and plate 70. The end mating surface 78 of drum 10 is formed in a plurality of ridges or protrusions 101 through 105 which have basically a rectangular cross-section in the preferred embodiment, although not limited thereto, these protrusions are concentric about the axis of drum rotation. Between adjacent pairs of protrusions 101 through 105 are corresponding valleys in which are located the ports 76 and 81 of respective ducts 26 and 82. Mating surface 88 of stationary plate 70 is likewise formed in a plurality of matching and complementary concentric protrusions 106 through 109 having corresponding valleys therebetween into which are interleaved protrusions 101 through 105 of drum 10. The clearance between mating surfaces 88 and 78 should be quite small and precise, being generally on the order of 0.001" to 0.010", and may be maintained so because of the presence of bearing 66 which prevents motion of drum 10 in directions both parallel and transverse to its axis of rotation. Ducts 90 and 94 have respective ports 92 and 96 located in the protrusions 106 through 109 so that alignment between said last named ports and various ones of ports 26 and 81 will occur as drum 10 rotates.

As shown in FIGURE 2, mating surfaces 88 and 78 have relative motion therebetween only in a direction normal to the plane of the paper. No matter what the angular position of drum 10, surfaces 88 and 78 are interleaved in such a manner that a corridor is maintained between the pairs of ports $92^n/76^n$ and $92^{n+1}/76^{n+1}$ of adjacent temporarily formed passageways. Each corridor thus partially isolates the adjacent passageways one from another by creating a tortuous route through which any leakage fluid must pass. However, the present invention includes a positive means of isolating the fluid passages. Stationary plate 70 is fitted with additional canals 110 through 114 each terminating in the middle of a respective one of the valleys between its protrusions 106 through 109. Each of the canals is joined to a low pressure manifold, invisible in FIGURE 2, but represented by the dotted lines 115. Low pressure manifold 115 is in turn connected to the low pressure side of fluid supply 93 so that any fluid withdrawn from a corridor is returned thereto.

Inasmuch as low pressure is maintained in manifold 115, all the canals 110 through 114 connected thereto will cause the creation of a low pressure region in the center of their associated corridors. Hence, high pressure fluid leaking from a fluid passageway adjacent thereto cannot reach an adjacent line because it is drained off into the low pressure manifold during its passage through the corridor. This by-passing action eliminates the danger of intermixing or crossing signals between adjacent fluid passageways without need for an O-ring seal or the like. Furthermore, there is no friction loss between mating surfaces 88 and 78 because they do not make physical contact.

Figure 3:
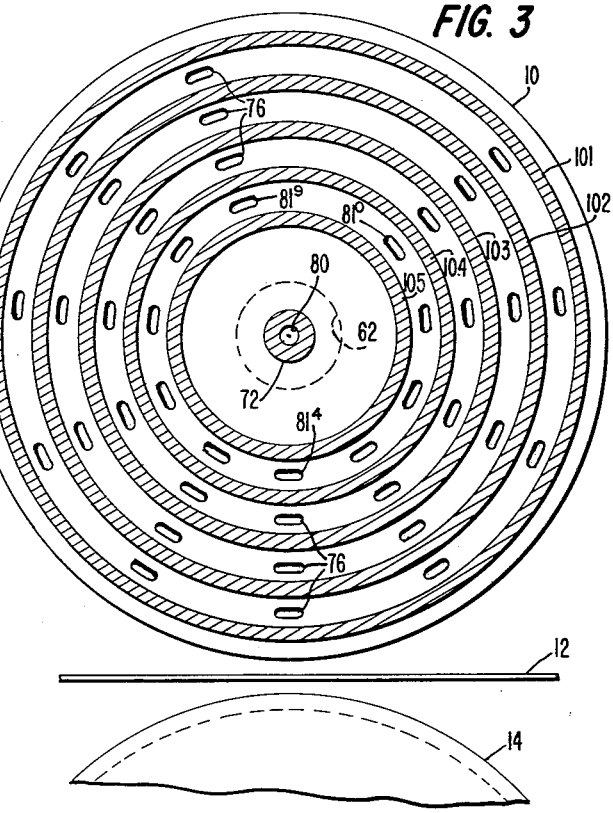
FIGURE 3 shows another sectional view of said first embodiment.

FIGURE 3 illustrates a view of the end surface of drum 10 taken in section along A—A' in FIGURE 2. This figure emphasizes the concentric ring construction of the protruded end surfaces, as well as showing the radial arrangement of the groups of ports 76 and 81 associated with the punch rows. The shape of these ports is preferably rectangular, or some other suitable shape, in the direction of motion in order to provide flexibility of punch timing.

Figure 5:
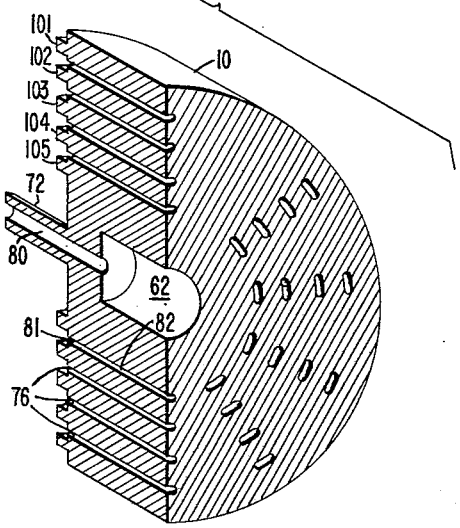
FIGURE 5 is a pictorial sectional view of said first embodiment.

FIGURE 4 is a sectional view of a portion of stationary plate 70 taken on the line B—B' in FIGURE 2. This section shows the position of manifold 115 with respect to ducts 90 and 94. It will be observed that manifold 115 is set to one side of ducts 90 to avoid intersecting therewith. Canals 110 through 114 therefore are bent, with a different leg shown in each of the FIGURES 2 and 4. FIGURE 5 is a sectional pictorial view of the invention of FIGURE 2 which emphasizes the concentricity of the mating surface protrusions.

In the embodiment of the invention shown in FIGURE 2, only one low pressure manifold 115 and one group of associated canals 110 through 114 are required in stationary plate 70. However, the present invention can be modified to provide instead a low pressure manifold in the moving drum 10. Furthermore, the locations of ports 92 and 76 may be interchanged such that the former are located in the valleys while the latter are located in the protrusions. These two modifications are illustrated in FIGURE 6, which is a sectional view of a second embodiment of the invention. FIGURE 7 is a sectional view taken through drum 10 on the line C—C' in FIGURE 6. In FIGURE 6, the end mating surface 78 of drum 10 is formed in a series of protrusions 125 through 128 in which are located the ports 76 and 81 of respective ducts 26 and 82. These protrusions are interleaved with corresponding and complementary valleys formed in the mating surface 88 of stationary plate 70, whereas protrusions 120 through 124 of surface 88 respectively fit into the valleys of surface 78. Ports 92 of ducts 90 and port 96 of duct 94 are located in respective ones of the valleys between protrusions 120 through 124. They therefore are successively aligned with each of the groups of ports located in the drum 10 as it revolves.

A group of low pressure canals 129 through 133 is provided within drum 10 for each of the groups of ports 76 and 81. The canals in each of said groups respectively connect the corridor between adjacent ports 76–81 of a group with a low pressure manifold. This configuration is more clearly shown in FIGURE 7 where a plurality of low pressure manifolds 134 are provided, one for each pair of groups. This configuration insures that as each group of ports 76–81 rotates into alignment with corresponding ports 92–96, the corridors existing between the ports of the temporarily formed passageways have a low pressure region therein in order to withdraw any leakage fluid. Such leakage fluid is transferred via the associated connecting canals to its associated manifold 134, which in turn exits into the hollow interior 62 of drum 10 from whence the fluid is returned via duct 80 to the low pressure side of fluid supply 93.

Although the present invention has been described for use in the rotating card punch drum such as disclosed in the above identified pending application, it is evident that the principles here explained may be applied to other environments. For example, one mating surface may have reciprocating or similar motion with respect to another, such that each can be formed in a plurality of corresponding straight parallel protrusions instead of the circular concentric protrusions necessary in the card punch device. Therefore, many modifications and alterations will be evident to one skilled in the art without departing from the spirit of the invention as defined in the appended claims.

I claim:

1. Sealing means for isolating each of a plurality of relatively high pressure fluid passageways one from another, where each said passageway comprises first and second ducts terminated in ports respectively located in first and second mating surfaces, with said mating surfaces being adjacent and movable with respect to each other to selectively align the ports of corresponding first and second ducts of the same passageways to allow the transmission of relatively high pressure fluid therethrough, said sealing means comprising: a labyrinthian corridor between the port locations of each successive pair of fluid passageways, said corridor being formed by an interleaving of said first and second mating surfaces, and means to maintain a relatively low pressure region within each of said labyrinthian corridors to thereby drain off any fluid which leaks from said passageways.

2. Sealing means according to claim 1 wherein said last named means comprises a low pressure manifold joined to each of said corridors.

3. Sealing means according to claim 1 wherein said first mating surface is stationary and said second mating surface is movable.

4. Sealing means according to claim 3 wherein said last named means comprises a low pressure manifold joined to each of said corridors.

5. Sealing means according to claim 3 wherein said low pressure means comprises a low pressure manifold joined to each of said corridors by a canal terminating in a port located in said first mating surface.

6. Sealing means according to claim 3 wherein said low pressure means comprises a low pressure manifold joined to each of said corridors by a canal terminating in a port located in said second mating surface.

7. In apparatus having a movable first member one surface of which is adjacent to a surface of a stationary second member and movable therewith during an index operation of said first member, where said stationary member contains a plurality of first fluid ducts each terminated in a port located in its said surface and said movable member contains a plurality of second fluid ducts each terminated in a port located in its said surface at a position such as to be moved into alignment with a first duct port individual thereto during an index operation in order to form a passageway through said members for fluid at relatively high pressure, the provision of sealing means for isolating each of said fluid passageways one from another, comprising: a labyrinthian corridor between the port positions of each successive pair of fluid passageways, said corridor being formed by an interleaving of said adjacent surfaces, and means to maintain a relatively low pressure region within each of said corridors to thereby drain off any high pressure fluid which leaks from said passageway ports.

8. The invention according to claim 7 wherein said last named means comprises a low pressure manifold joined to each of said corridors.

9. The invention according to claim 7 wherein said last named means comprises a low pressure manifold contained in said stationary member and joined to each of said corridors.

10. The invention according to claim 7 wherein said last named means comprises a low pressure manifold contained in said movable body and joined to each of said corridors.

11. Apparatus comprising a first member one surface of which has a portion formed in a first plurality of parallel protrusions with corresponding valleys therebetween, a second member one surface of which has a portion formed in a second plurality of parallel protrusions with corresponding valleys therebetween, which are complementary to and interleaved with said first plurality so as to mate with respective ones of said first member valleys and vice versa, where said first and second members are movable with respect to each other, at least one port located in each of said second member protrusions for the passage of relatively high pressure fluid therethrough, at least one port located in each of said first member valleys for the passage of relatively high pressure fluid therethrough and with which the corresponding interleaved protrusion port matches as one of said members moves with respect to the other, and a relatively low pressure manifold connected with each region where said first member protrusions mate with said second member valleys to thereby drain off any fluid which leaks from said ports.

12. Apparatus according to claim 11 wherein said manifold is connected through said second member surface with each said region.

13. Apparatus according to claim 11 wherein one of said members has a plurality of high pressure ports located in each of its respective high pressure mating surfaces, each port of a said plurality being successively matched with the port of the corresponding high pressure mating surface of the other member as they move with respect to each other.

14. Apparatus according to claim 13 wherein said manifold is connected through said one member surface with each said region in the vicinity of each port of an adjoining plurality.

15. Apparatus comprising a rotatable drum one end surface of which has a portion formed in a first plurality of protrusions, with corresponding valleys therebetween, which are concentric about its axis of rotation, a stationary side plate one surface of which has a portion formed in a second plurality of concentric protrusions with corresponding valleys therebetween, which are complementary to and interleaved with said first plurality so as to mate with respective ones of said drum valleys and vice versa, at least one port located in each of said stationary plate protrusions for the passage of relatively high pressure fluid therethrough, at least one port located in each of said drum valleys for the passage of relatively high pressure fluid therethrough and with which the corresponding interleaved stationary protrusion port matches as said drum rotates in order to transfer fluid therebetween, and a relatively low pressure manifold connected with each region where said drum protrusions mate with said stationary plate valleys to thereby drain off any high pressure fluid which leaks from said ports.

16. Apparatus according to claim 15 wherein said manifold is connected through said stationary plate surface with each said region.

17. Apparatus according to claim 15 wherein each of said drum valleys has a plurality of ports each of which successively matches with the corresponding stationary protrusion port as said drum rotates.

18. Apparatus according to claim 17 wherein said manifold is connected through said stationary plate surface with each said region in the vicinity of each port adjoining thereto.

19. Apparatus comprising a rotatable drum one end surface of which has a portion formed in a first plurality of protrusions, with corresponding valleys therebetween, which are concentric about its axis of rotation, a stationary side plate one surface of which has a portion formed in a second plurality of concentric protrusions, with corresponding valleys therebetween, which are complementary to and interleaved with said first plurality so as to mate with respective ones of said drum valleys and vice versa, at least one port located in each of said stationary plate valleys for the passage of relatively high pressure fluid therethrough, at least one port located in each of said drum protrusions for the passage of relatively high pressure fluid therethrough and with which the corresponding interleaved stationary valley port matches as said drum rotates in order to transfer fluid therebetween, and a relatively low pressure manifold connected with each region where said drum valleys mate with said stationary plate protrusions to thereby drain off any high pressure fluid which leaks from said ports.

20. Apparatus according to claim 19 wherein said manifold is connected through said drum surface with each said region.

21. Apparatus according to claim 19 wherein each of said drum protrusions has a plurality of ports each of which successively matches with the corresponding stationary protrusion ports as said drum rotates.

22. Apparatus according to claim 21 wherein said manifold is connected through said drum end surface with each said region in the vicinity of each protrusion port adjoining thereto.

References Cited in the file of this patent
UNITED STATES PATENTS

| | | |
|---|---|---|
| 251,019 | Babcock | Dec. 20, 1881 |
| 913,407 | Ljungstrom | Feb. 23, 1909 |
| 1,873,988 | Van Rijswijk | Aug. 30, 1932 |
| 1,975,230 | Jewett | Oct. 2, 1934 |
| 2,706,532 | Ringo | Apr. 19, 1955 |